(12) United States Patent
Sasaoka et al.

(10) Patent No.: US 6,666,591 B2
(45) Date of Patent: Dec. 23, 2003

(54) METHOD FOR CONNECTING OPTICAL FIBERS

(75) Inventors: Eisuke Sasaoka, Yokohama (JP); Motonori Nakamura, Yokohama (JP); Osamu Kasuu, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/939,662

(22) Filed: Aug. 28, 2001

(65) Prior Publication Data

US 2002/0057877 A1 May 16, 2002

(30) Foreign Application Priority Data

Aug. 28, 2000 (JP) ........................................ 2000-257845

(51) Int. Cl.[7] .............................................. G02B 6/255
(52) U.S. Cl. .......................................... 385/95; 385/96
(58) Field of Search ............................ 385/27, 95, 123, 385/96

(56) References Cited

U.S. PATENT DOCUMENTS

| | | | | |
|---|---|---|---|---|
| 5,732,170 A | * | 3/1998 | Okude et al. ................... | 385/27 |
| 6,470,126 B1 | * | 10/2002 | Mukasa ........................ | 385/123 |
| 6,543,942 B1 | * | 4/2003 | Veng ............................. | 385/95 |
| 2003/0063875 A1 | * | 4/2003 | Bickham et al. ............... | 385/98 |

FOREIGN PATENT DOCUMENTS

| | | | |
|---|---|---|---|
| DE | 36 09 407 A1 | 9/1987 | |
| GB | 2 213 954 A | 8/1989 | |
| JP | 08 190030 A | * 7/1996 | ........... G02B/6/255 |
| JP | 2618500 | 3/1997 | |
| JP | 8-190030 | 7/1998 | |
| JP | 2951562 | 7/1999 | |
| WO | WO 00/19256 | 4/2000 | |

OTHER PUBLICATIONS

Edvold, et al. "New Technique for Reducing the Splice Loss to Dispersion Compensating Fiber" 22nd European Conference on Optical Communication (ECOC) (1996) pp. 2.245–2.248.

Gruner–Nielsen, et al. "Dispersion Compensating Fibers" Optical Fiber Technology 8 (2000) pp. 164–180.

\* cited by examiner

Primary Examiner—Audrey Chang
Assistant Examiner—Denise S. Allen
(74) Attorney, Agent, or Firm—McDermott, Will & Emery

(57) ABSTRACT

Methods for connecting two optical fibers having different mode field diameters ((MFD) with low connection loss is proposed. One method comprises steps of preparing the third fiber (Fiber 3), a short length and MFD being smaller than that of the first fiber (Fiber 1) and larger than that of the second (Fiber 2), connecting the Fiber 1 to 3, connecting Fiber 2 to 3, and increasing MFD of Fiber 3 near the part connected or to be connected to Fiber 1, or MFD of Fiber 2 near the part connected or to be connected to Fiber 3 by heating the corresponding part. The other method comprises steps of preparing a short length Fiber 3 having smaller MFD than that of Fiber 1, increasing MFD of Fiber 3 near the part to be connected to Fiber 1 by heating the corresponding part, and then connecting Fiber 1 to 3, and 3 to 2 in that order.

8 Claims, 1 Drawing Sheet

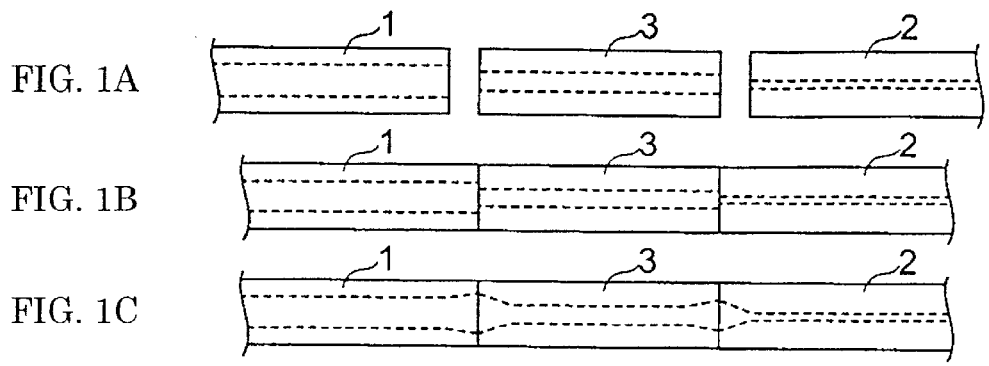
FIG. 1A
FIG. 1B
FIG. 1C
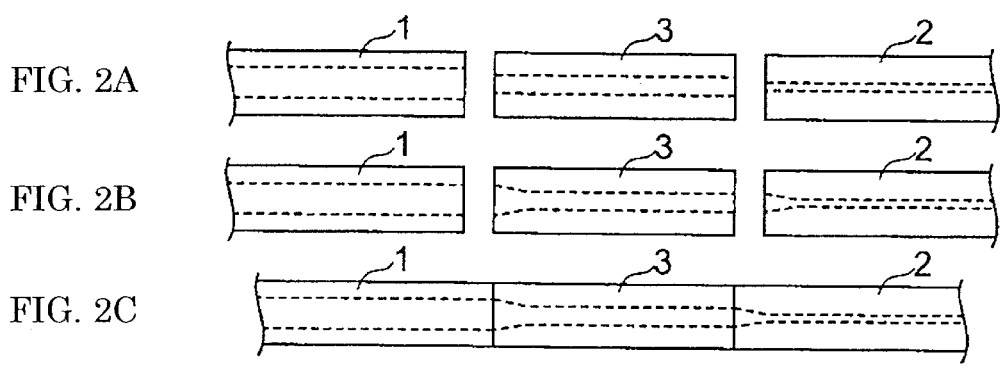
FIG. 2A
FIG. 2B
FIG. 2C
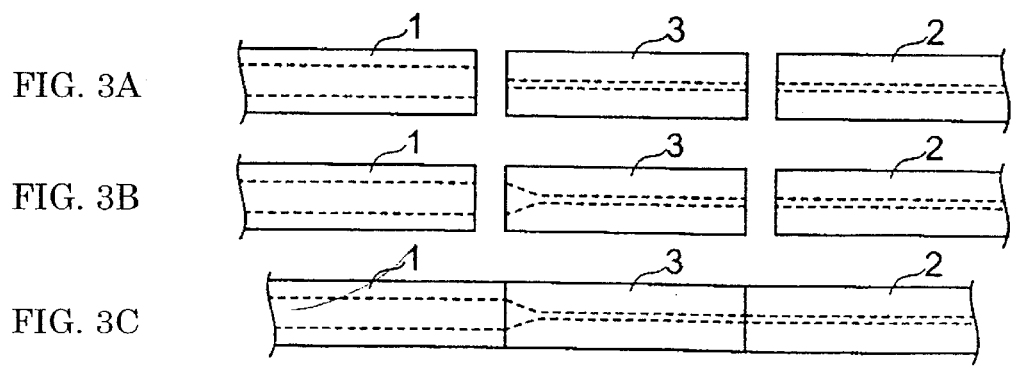
FIG. 3A
FIG. 3B
FIG. 3C

METHOD FOR CONNECTING OPTICAL FIBERS

BACKGROUND OF THE INVENTION

1. Field of the Invention

The present invention relates to a method for connecting an optical fiber having a large Mode Field Diameter (MFD) to an optical fiber having a small MFD.

2. Related Background Art

High-speed communications utilizing a 1.55 μm wavelength band via conventional optical transmission lines having a zero dispersion wavelength in a 1.3 μm wavelength band have been put to practical use. In such a case, optical fibers having a negative dispersion at 1.55 μm have been inserted, as dispersion compensating fibers, in the midsections of the optical transmission lines, so that the overall chromatic dispersion of the optical transmission lines can be reduced. MFDs of the dispersion compensating fibers are smaller than those of the optical fibers having a zero dispersion wavelength in a 1.3 μm wavelength band.

In the case in which two optical fibers having different MFDs are connected together, connection loss increases if the optical fibers are merely bonded to each other. Accordingly, methods for reducing connection loss as disclosed in Japanese Patent Nos. 2618500 and 2951562 have been known in the art. According to the method disclosed in Japanese Patent No. 2618500, optical fibers having different core diameters are fusion-spliced together at first. Then, one of the optical fibers having a smaller core diameter is heated at a part near the spliced part, so that a dopant, contained in a core portion of the optical fiber, can be diffused and the difference of core diameters reduced.

Further, in Japanese Patent No. 2951562, is described a method for connecting a dispersion compensating fiber to a single mode optical fiber, with a low connection loss. According to this method, a dispersion compensating fiber is spliced to a single mode optical fiber via an intermediate optical fiber having MFD that is approximately the same as that of the dispersion compensating fiber. Then, an end portion of the intermediate optical fiber having been spliced to the single mode optical fiber is heated so that the MFD thereof can be increased to become the same as that of the single mode optical fiber.

SUMMARY OF THE INVENTION

It is an object of the present invention to provide a method for connecting optical fibers having different MFDs with a low connection loss.

In order to achieve this object, according to one aspect of the present invention, a method for connecting optical fibers includes the steps of preparing a third optical fiber having a short length and whose MFD is smaller than that of a first optical fiber and larger than that of a second optical fiber; connecting the first optical fiber to the third optical fiber; connecting the second optical fiber to the third optical fiber; and increasing at least one of the MFD of the third optical fiber near the part connected or to be connected to the first optical fiber and the MFD of the second optical fiber near the part connected or to be connected to the third optical fiber by heating the corresponding part.

In the present invention, "an optical fiber having a short length" means such a fiber having a length of about 0.1 through 10 m, and is not for extending the length of a transmission line.

The step of increasing the MFD may be performed before or after the steps of connecting the first optical fiber to the third optical fiber and connecting the second optical fiber to the third optical fiber.

Another method for connecting optical fibers is also proposed that includes steps of preparing a third optical fiber having a short length and an MFD smaller than that of the first optical fiber; increasing the MFD of the third optical fiber near the part to be connected to the first optical fiber by heating the corresponding part; and connecting the first optical fiber to the third optical fiber, and the third optical fiber to the second optical fiber in that order.

The above and further objects and novel features of the present invention will be more fully clarified from the following detailed description when the same is read in connection with the accompanying drawings. It is to be expressly understood, however, that the drawings are for the purpose of illustration only and are not intended as definitions of any limit of the invention.

BRIEF DESCRIPTION OF THE DRAWINGS

FIGS. 1A through 1C are side views of optical fibers which are connected together by a method for connecting optical fibers according to one embodiment, wherein FIG. 1A shows a state before a splicing process, FIG. 1B shows a state after the splicing and before a heating process, and FIG. 1C shows a state after the heating process.

FIGS. 2A through 2C are side views of optical fibers which are connected together by a method for connecting optical fibers according to another embodiment, wherein FIG. 2A shows a state before a connecting process, FIG. 2B shows a state after a heating and before a splicing process, and FIG. 2C shows a state after the splicing process.

FIGS. 3A through 3C are side views of optical fibers which are connected together by a method for connecting optical fibers according to another embodiment, wherein FIG. 3A shows a state before a connecting process, FIG. 3B shows a state after a heating and before a splicing process, and FIG. 3C shows a state after the splicing process.

DESCRIPTION OF THE PREFERRED EMBODIMENTS

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

The first embodiment will be described below. Optical fibers which are connected together by applying a connecting method according to the first embodiment are shown in FIGS. 1A to 1C. The dotted lines in fibers show the MFD of each optical fiber.

As shown in FIGS. 1A through 1C, a first optical fiber 1 and a second optical fiber 2 are connected together with a third optical fiber 3 interposed therebetween. The third optical fiber 3 having a short length is used for connecting the first optical fiber 1 and the second optical fiber 2.

Table I shows MFD, chromatic dispersion, and dispersion slope of each such optical fiber.

TABLE I

|  | MFD ($\mu$m) | Chromatic dispersion (ps · nm$^{-1}$ · km$^{-1}$) | Dispersion slope (ps · nm$^{-2}$ · km$^{-1}$) |
| --- | --- | --- | --- |
| First optical fiber | 11 | 20 | 0.06 |
| Second optical fiber | 5 | −45 | −0.06 |
| Third optical fiber | 9 | 17 | 0.06 |

As shown in Table I, the MFDs of these optical fibers can be compared as follows:

(MFD of First optical fiber)>(MFD of Third optical fiber)>(MFD of Second optical fiber)

The above-described MFDs are defined as those before a heating process in which MFDs are increased. In this embodiment, the first optical fiber 1 is a Single Mode optical Fiber (SMF), and the second optical fiber 2 is a Dispersion Compensating optical Fiber (DCF) which compensates dispersion caused by the first optical fiber 1. Therefore, the chromatic dispersion and dispersion slope of the second optical fiber 2 have opposite signs to those of the first optical fiber 1.

In this embodiment, both the first optical fiber 1 and the third optical fiber 3, and then the third optical fiber 3 and the second optical fiber 2 are fusion-spliced together by arc discharge at each connecting part. Then, optical fibers having the smaller MFD at each spliced part are heated with a gas burner, so that the MFD thereof can be increased at the heated parts. The optical fibers contain a dopant such as germanium oxide (GeO$_2$), etc., in the core portions thereof, and the MFDs thereof increase because the dopant is diffused by applying heat.

Accordingly, as shown in FIG. 1C, the MFD of the optical fiber having the smaller MFD at each spliced part is increased. Although the MFD of the optical fiber, having the larger MFD, is also increased, the MFD of the optical fiber having the smaller MFD is increased much more. Thus, the MFDs of the opposing optical fibers can be made approximately the same at each of the spliced parts.

Since MFDs of the optical fibers have been made approximately same at each of the spliced parts, connection loss can be reduced at each of the spliced parts. In this embodiment, the connection loss in the optical fibers thus connected as described above was 0.3 dB at 1.55 $\mu$m. This connection loss was calculated from the light incident to the first optical fiber 1 and that emitted from the second optical fiber 2, and thus includes the loss due to the optical fibers themselves. The loss due to the optical fibers themselves can be ignored because it is negligibly small compared with connection losses occurring at the spliced parts.

For the purpose of comparison, connection loss in the case in which the MFDs were not increased was also measured. The measured connection loss was 1.3 dB, which was larger than the connection loss in this embodiment. In addition, the connection loss was measured in the case in which the first optical fiber 1 and the second optical fiber 2 had been directly connected together by arc discharge without using the third optical fiber 3 interposed therebetween, nor increasing MFD thereof. The measured connection loss was 1.5 dB, which was also larger than the connection loss in the first embodiment.

In this embodiment, the third optical fiber 3 whose MFD is between those of the first optical fiber 1 and the second optical fiber 2 is used. Thus, the extent to which MFDs must be increased are small compared as the method disclosed in Japanese Patent No. 2951562, in which optical fibers having considerably different MFDs are connected together. Accordingly, the time necessary for completing the connection can be reduced, facilitating operations thereof. In addition, heating time can be shortened and heating temperature can be maintained low, so bending of the optical fibers can be prevented as well as the increase of bending loss.

Next, the second embodiment will be described. MFDs of optical fibers which are connected together by applying a connecting method according to the second embodiment are similar to those in the first embodiment. So, FIG. 1 will be referred in the following description.

MFD, chromatic dispersion, and dispersion slope of the first optical fiber 1 through the third optical fiber 3 are shown in Table II.

TABLE II

|  | MFD ($\mu$m) | Chromatic dispersion (ps · nm$^{-1}$ · km$^{-1}$) | Dispersion slope (ps · nm$^{-2}$ · km$^{-1}$) |
| --- | --- | --- | --- |
| First optical fiber | 11 | 20 | 0.06 |
| Second optical fiber | 4 | −15 | 0.01 |
| Third optical fiber | 7 | — | — |

The MFDs shown in Table II are those before a heating process, in which they are increased. In addition, in this embodiment, the first optical fiber 1 is a SMF, and the second optical fiber 2 is an optical fiber to be used for Raman amplification. The method for connecting optical fibers used in this embodiment is the same as that used in the first embodiment.

Accordingly, as shown in FIG. 1C, at each of the spliced parts, the MFD of optical fiber having the smaller MFD is increased, and the MFD of the opposing optical fiber is made approximately the same. Thus, connection loss can be reduced at each of the spliced parts. In this embodiment, connection loss in the optical fibers was 0.5 dB at 1.55 $\mu$m.

For the purpose of comparison, connection loss in the case where MFDs had not been increased was also measured. The connection loss was 1.5 dB, which was larger than that in this embodiment. In addition, connection loss in the case where the first optical fiber 1 and the second optical fiber 2 had been directly connected together by arc discharge without using the third optical fiber 3 interposed therebetween, nor increasing MFD was also measured. The measured connection loss was 2.1 dB, which was also larger than the connection loss in this embodiment.

In this embodiment, the third optical fiber 3, whose MFD is between those of the first optical fiber 1 and the second optical fiber 2 is used. Thus, the extent of required increase of the MFD in each fiber is small compared to the method disclosed in Japanese Patent No. 2951562, in which optical fibers having substantially different MFDs are connected together. Accordingly, the time necessary for completing the connection can be reduced and operations thereof can be facilitated. In addition, the heating time can be shortened and heating temperature can be maintained low, so bending of the optical fibers can be prevented as well as the increase of bending loss.

Next, the third embodiment will be described. FIGS. 2A to 2C show side views of optical fibers which are connected together by applying a connecting method according to this embodiment. Dotted lines in the figures show the MFDs of the optical fibers.

As shown in FIGS. 2A to 2C, a first optical fiber 1 and a second optical fiber 2 are connected together with a short length third optical fiber 3 interposed therebetween. The optical fibers are the same as those used in the first embodiment.

In this embodiment, before optical fibers are connected together, an end of an optical fiber having a smaller MFD than the other at each connecting part is heated with a gas burner so that the MFDs at the respective connecting parts become approximately the same in advance. More specifically, the end portion of the third optical fiber 3 to be connected to the first optical fiber 1 have been heated so that the MFD thereof can be increased to become the same as that of the first optical fiber 1. Similarly, the end portion of the second optical fiber 2 to be connected to the third optical fiber 3 have been heated so that the MFD thereof can be increased to become the same as that of the part in the third optical fiber 3 which has not been increased.

Then, the first optical fiber 1 and the third optical fiber 3, and then the third optical fiber 3 and the second optical fiber 2 are fusion-spliced together by arc discharge at each connecting part. Since the MFDs of the optical fibers have been made approximately the same at each of the connecting parts in advance, connection loss can be reduced at each of the spliced parts. Thus, in this embodiment, connection loss was 0.25 dB at 1.55 $\mu$m in the optical fibers which were connected as described above.

The connection loss in this embodiment was smaller than both the connection loss of 1.3 dB, which was in the case in which the MFDs were not increased, and the connection loss of 1.5 dB, which was in the case in which the first optical fiber 1 and the second optical fiber 2 were directly connected together, as described above with respect to the comparative examples for the first embodiment. Furthermore, the connection loss in this embodiment was smaller than that in the first embodiment. In the first embodiment, the MFDs of the spliced parts of the third optical fiber 3 and the second optical fiber 2 must be increased to the MFDs of the spliced parts of the first optical fiber 1 and the third optical fiber 3, respectively, which are increased to some extent by the side-effect of heat applied in the connecting process. In contrast, in this embodiment, the extent to which each MFD of the third optical fiber 3 and the second optical fiber 2 have to be increased is small as compared with those in the first embodiment. Therefore, MFD variations of the second optical fiber 2 and the third optical fiber 3 in the longitudinal direction can be reduced, and an increase of connection loss due to a sudden change of the MFD in the longitudinal direction can be suppressed.

Also in this embodiment, the third optical fiber 3, whose MFD is between those of the first optical fiber 1 and the second optical fiber 2 is used. Thus, the extent to which each MFD must be increased is small, and the time necessary for completing the connection can be reduced and operations thereof can be facilitated. In addition, since the amounts by which the MFDs must be increased are small, the heating time and the heating temperature can be reduced, and consequently bending loss is prevented from being increased.

Next, the fourth embodiment will be described. In FIGS. 3A to 3C are shown side views of optical fibers which are connected together by applying a connecting method according to this embodiment. The dotted lines in the figures show the MFDs of the optical fibers.

As shown in FIGS. 3A to 3C, the first optical fiber 1 and a second optical fiber 2 are connected together with a short length third optical fiber 3 interposed therebetween. Table III shows MFD, chromatic dispersion, and dispersion slope of each optical fiber.

TABLE III

|  | MFD ($\mu$m) | Chromatic dispersion (ps · nm$^{-1}$ · km$^{-1}$) | Dispersion slope (ps · nm$^{-2}$ · km$^{-1}$) |
| --- | --- | --- | --- |
| First optical fiber | 11 | 20 | 0.06 |
| Second optical fiber | 5 | −45 | −0.06 |
| Third optical fiber | 5 | −30 | −0.06 |

As shown in Table III, the relationship of the MFDs of the three optical fibers can be expressed as follows:

(*MFD* of First optical fiber)>(*MFD* of Third optical fiber)=(*MFD* of Second optical fiber)

Similar to the first embodiment, the first optical fiber 1 is a SMF, and the second optical fiber 2 is a DCF. The chromatic dispersion and the dispersion slope of the second optical fiber 2 have opposite signs to those of the first optical fiber 1, that is, negative signs. In addition, the chromatic dispersion and the dispersion slope of the third optical fiber 3 have the same signs as those of the second optical fiber 2.

In this embodiment, the end portion of the third optical fiber 3 connected to the first optical fiber 1 have been heated so that the MFD thereof can be increased to become the same as that of the first optical fiber 1 before the connecting process.

Then, the first optical fiber 1 and the third optical fiber 3, and the third optical fiber 3 and the second optical fiber 2 are fusion-spliced together by arc discharge at each connecting part. Since the MFDs of the first optical fiber 1 and the third optical fiber 3 have been made the same at the connecting part thereof in advance, connection loss can be reduced at each of the spliced parts. In the fourth embodiment, connection loss in the optical fibers which were connected as described above was 0.3 dB at 1.55 $\mu$m.

For the purpose of comparison, connection loss in the case in which MFDs had not been increased was also measured. The connection loss was 1.5 dB at 1.55 $\mu$m, which was larger than that in this embodiment. In addition, connection loss was also measured in the case when the first optical fiber 1 and the second optical fiber 2 had been directly connected together by arc discharge without using the third optical fiber 3 interposed therebetween. The measured connection loss was 1.5 dB at 1.55 $\mu$m, which was also larger than that in this embodiment.

Next, the fifth embodiment will be described. Since MFDs of optical fibers which are connected together by applying a connecting method according to this embodiment are similar to those in the first embodiment, this embodiment will be described with reference to FIGS. 1A to 1C.

As shown in FIGS. 1A to 1C, a first optical fiber 1 and a second optical fiber 2 are connected together with a third optical fiber 3 interposed therebetween. The third optical fiber 3 is a short length fiber which is used for connecting the first optical fiber 1 and the second optical fiber 2. The MFD, chromatic dispersion, and dispersion slope of these three fibers are shown in Table IV.

TABLE IV

|  | MFD ($\mu$m) | Chromatic dispersion (ps · nm$^{-1}$ · km$^{-1}$) | Dispersion slope (ps · nm$^{-2}$ · km$^{-1}$) |
| --- | --- | --- | --- |
| First optical fiber | 11 | 17 | 0.06 |
| Second optical fiber | 5 | −100 | −0.34 |
| Third optical fiber | 7 | — | — |

As shown in Table IV, the relationship of MFDs in the first optical fiber 1, the second optical fiber 2, and the third optical fiber 3 can be expressed as:

(MFD of First optical fiber)>(MFD of Third optical fiber)>(MFD of Second optical fiber)

In this embodiment, the first optical fiber 1 is a SMF having a matched-clad refractive index profile and a zero dispersion wavelength in the 1.3 μm wavelength band, and the second optical fiber 2 is a DCF having a W-shaped refractive index profile. Therefore, the chromatic dispersion and the dispersion slope of the second optical fiber 2 have opposite signs to those of the chromatic dispersion and the dispersion slope of the first optical fiber 1, that is, negative signs. In addition, the third optical fiber 3 is an optical fiber having a matched-clad refractive index profile, and its length is 2 m.

In this embodiment, the first optical fiber 1 and the third optical fiber 3, and then the third optical fiber 3 and the second optical fiber 2, are fusion-spliced together by arc discharge at each connecting part. Then, one of the optical fibers having a smaller MFD than the other is heated with a gas burner at the spliced part to increase the MFD thereof so that it becomes the same as that of the other optical fiber. In this embodiment, connection loss in the optical fibers which were connected as described above was 0.3 dB at 1.55 μm.

For the purpose of comparison, connection loss was also measured in the case when the first optical fiber 1 and the second optical fiber 2 had been simply fusion-spliced together with the third optical fiber 3 interposed therebetween and the heating had not been performed for making MFDs same. The connection loss was 1.3 dB at 1.55 μm. This shows the fiber connection method according to this embodiment had superior transmitting characteristics. In addition, connection loss was also measured in the case when the first optical fiber 1 and the second optical fiber 2 had been directly connected together. Connection loss was 1.5 dB at 1.55 μm, which was also larger than that in this embodiment.

Further, connection loss was also measured, which was in the case in which the first optical fiber 1 and the second optical fiber 2 were directly connected together and the MFDs thereof were made same by heating process. The connection loss was 1.3 dB at 1.55 μm. For matching the MFDs of the first optical fiber 1 and the second optical fiber 2 which are directly connected together, the second optical fiber 2 is heated with a gas burner so that the MFD of its spliced part may be increased to become the same as that of the first optical fiber 1. However, since the second optical fiber 2 has a W-shaped refractive index profile, a cutoff wavelength of fundamental mode becomes closer to 1.55 μm wavelength band, namely, operating wavelength band, depending on the increase of the MFD. Thus, loss is increased due to the influence of the cutoff wavelength, and connection loss is reduced only by a little (in the above-described case, from 1.5 dB to 1.3 dB). Accordingly, sufficient reduction of connection loss can not be achieved.

Accordingly, in case in which cutoff of fundamental mode occurs at either one of the first optical fiber 1 and the second optical fiber 2, an optical fiber used as the third optical fiber 3 disposed between the first optical fiber 1 and the second optical fiber 2 is preferably such that it does not allow the cutoff of the fundamental mode to occur in itself and its MFD is close to that of the optical fiber at which the cutoff occurs.

In this embodiment, the difference between the MFDs of the second optical fiber 2 and the third optical fiber 3 is 2 μm, and is smaller than the difference between those of the first optical fiber 1 and the second optical fiber 2, which is 4 μm. Thus, the heating time needed for making MFDs same at the spliced parts of the second optical fiber 2 and the third optical fiber 3 can be shorter than the time needed at the spliced parts of the first optical fiber 1 and the third optical fiber 3. Accordingly, the MFDs can be made almost same without causing cutoff wavelength of the second optical fiber 2 to influence the characteristics at the operating wavelength, and connection loss can be reduced.

On the other hand, since both the first optical fiber 1 and the third optical fiber 3 are matched-clad optical fibers, cutoff of fundamental mode does not occur. Accordingly, even when the heating to make MFDs same is performed for a relatively prolonged time, an increase of connection loss does not occur.

Next, the sixth embodiment will be described. Since the relationship among MFDs of optical fibers which are connected together by applying a connecting method according to this embodiment is similar to those in the fourth embodiment, this embodiment will be described with reference to FIGS. 3A to 3C.

As shown in FIGS. 3A to 3C, a first optical fiber 1 and a second optical fiber 2 are connected together with a third optical fiber 3 interposed therebetween. The third optical fiber 3 is a short length optical fiber to be used for connecting the first optical fiber 1 and the second optical fiber 2. MFD, chromatic dispersion, and dispersion slope of ths of these three fibers are shown in Table V.

TABLE V

|  | MFD (μm) | Chromatic dispersion (ps · nm$^{-1}$ · km$^{-1}$) | Dispersion slope (ps · nm$^{-2}$ · km$^{-1}$) |
| --- | --- | --- | --- |
| First optical fiber | 11 | 20 | 0.06 |
| Second optical fiber | 5 | −55 | −0.16 |
| Third optical fiber | 5 | −80 | 0.09 |

As shown in Table V, the relationship among MFDs of these fibers can be expressed as follows:

(MFD of First optical fiber)>(MFD of Third optical fiber)=(MFD of Second optical fiber).

In this embodiment, the first optical fiber 1 is a SMF having a depressed-clad refractive index profile, and the second optical fiber 2 is a DCF having a W-shaped refractive index profile. Therefore, the chromatic dispersion and the dispersion slope of the second optical fiber 2 have opposite signs, namely, negative signs to those of the first optical fiber 1. In addition, the third optical fiber 3 is a matched-clad DCF having a length of 5 m.

In this embodiment, before optical fibers are connected together, an end of an optical fiber having a smaller MFD than the other at each connection part is heated with a gas burner so that the MFDs at the respective connecting parts become the same in advance. More specifically, the end portion of the third optical fiber 3 to be connected to the first optical fiber 1 had been heated so that the MFD thereof can be increased to become the same as that of the first optical fiber 1.

Then, the connecting parts of the first optical fiber 1 and the third optical fiber 3, and then, those of the third optical fiber 3 and the second optical fiber 2, are fusion-spliced together by arc discharge. Since the MFDs of the first optical fiber 1 and the third optical fiber 3 had been made the same at the spliced part thereof in advance, radiation loss can be suppressed at each of the spliced parts. Here, connection loss was 0.3 dB at 1.55 m μm in the optical fibers which had been connected as described above.

MFDs of the second optical fiber 2 and the third optical fiber 3 are same from the beginning, and so they can be connected together with low loss without performing the heating process to increase the MFD at either of the connecting part. Further, cutoff of fundamental mode occurs in the second optical fiber 2 if the MFD thereof is increased, as it has a W-shaped refractive index profile. However, increase of loss due to cutoff does not occur at the operating wavelength since increase of its MFD is not required.

On the other hand, at the connecting part of the first optical fiber 1 and the third optical fiber 3, the MFDs thereof are made the same by heating the third optical fiber 3 to increase the MFD thereof prior to the connecting process. Since the third optical fiber 3 is a matched-clad optical fiber, increase of connection loss due to cutoff of the fundamental mode does not occur. Further, the MFD of the first optical fiber 1 need not be increased in this case, as opposed to the case in which the MFD of the third optical fiber 3 must be increased after being connected to the first optical fiber 1. Accordingly, the MFD of the third optical fiber 3 needs to be increased only to the same extent of the MFD of the first optical fiber 1.

In the case when MFD of the third optical fiber 3 is increased after having been connected to the first optical fiber 1, the MFD of the third optical fiber 3 must be increased to the extent of the MFD of the first optical fiber 1 which has been increased to some degree by heat applied in the connecting process. Different from such case, the MFD of the third optical fiber 3 needs to be increased to a smaller degree in this embodiment. Thus, MFD variation in the longitudinal direction of the third optical fiber 3 can be reduced, and the increase of connection loss due to the sudden change of MFD in the longitudinal direction can be suppressed.

For the purpose of comparison, connection loss was also measured in case in which heating had not been performed to make MFDs same. The measured connection loss was 1.5 dB at 1.55 μm and the optical fibers connected according to this embodiment had superior transmitting characteristics. In addition, connection loss was also measured in the case in which the first optical fiber 1 and the second optical fiber 2 had been directly connected together by arc discharge without using the third optical fiber 3 interposed therebetween nor increasing MFD by heating with a gas burner. The measured connection loss was 1.5 dB at 1.55 μm, and the optical fibers connected according to this embodiment, in which the third optical fiber 3 had been used and then MFDs had been made same at each of the connecting parts, had superior transmitting characteristics.

The present invention is not limited to the above-described embodiments. For example, in case in which the relationship of MFDs in optical fibers is expressed as:

(*MFD* of First optical fiber)>(*MFD* of Third optical fiber)>(*MFD* of Second optical fiber), connection loss can be reduced even when MFDs having been made same only at one of the spliced parts. Therefore, it may be sufficient to make MFDs of the three optical fibers by heating at least one of the spliced parts. Alternatively, making MFDs at the heating process may be performed at one of the spliced parts, and some other methods for reducing connection loss may be applied to the other spliced part.

What is claimed is:

1. A method for connecting a first optical fiber to a second optical fiber having a mode field diameter which is smaller than the mode field diameter of the first optical fiber, the method comprising the steps of:

preparing a third optical fiber having a short length and a mode field diameter which is smaller than the mode field diameter of the first optical fiber and larger than the mode field diameter of the second optical fiber;

connecting the first optical fiber to the third optical fiber;

connecting the second optical fiber to the third optical fiber; and increasing at least one of the mode field diameter of a part of the third optical fiber near a portion connected to or to be connected to the first optical fiber and the mode field diameter of a part of the second optical fiber near a portion connected to or to be connected to the third optical fiber by heating.

2. A method for connecting a first optical fiber to a second optical fiber having a W-shaped refractive index profile and a mode field diameter which is smaller than the mode field diameter of the first optical fiber, the method comprising the steps of:

preparing a third optical fiber having a short length and a mode field diameter which is smaller than the mode field diameter of the first optical fiber and larger than the mode field diameter of the second optical fiber;

connecting the first optical fiber to the third optical fiber;

connecting the second optical fiber to the third optical fiber; and increasing at least one of the mode field diameter of a part of the third optical fiber near a portion connected to or to be connected to the first optical fiber and the mode field diameter of a part of the second optical fiber near a portion connected to or to be connected to the third optical fiber by heating.

3. A method for connecting optical fibers in accordance with one of claims 1 and 2, wherein the step of increasing the mode field diameters is performed after the step of connecting the first optical fiber to the third optical fiber and the step of connecting the second optical fiber to the third optical fiber.

4. A method for connecting optical fibers in accordance with one of claims 1 and 2, wherein the step of increasing the mode field diameter is performed before the step of connecting the first optical fiber to the third optical fiber and the step of connecting the second optical fiber to the third optical fiber.

5. A method for connecting a first optical fiber to a second optical fiber having a mode field diameter which is smaller than the mode field diameter of the first optical fiber, the method comprising the steps of:

preparing a third optical fiber having a short length and a mode field diameter which is smaller than the mode field diameter of the first optical fiber;

increasing the mode field diameter of a part of the third optical fiber near a portion to be connected to the first optical fiber by heating such part; and connecting the first optical fiber to the third optical fiber, and the second optical fiber to the third optical fiber.

6. A method for connecting a first optical fiber to a second optical fiber, having a W-shaped refractive index profile and a smaller mode field diameter than the mode field diameter of the first optical fiber, the method comprising the steps in the sequence of:

preparing a third optical fiber having a short length and a mode field diameter which is smaller than the mode field diameter of the first optical fiber and approximately the same as the mode field diameter of the second optical fiber;

increasing the mode field diameter of a part of the third optical fiber near a portion to be connected to the first optical fiber by heating such part; and connecting the first optical fiber to the third optical fiber, and the second optical fiber to the third optical fiber.

7. A method for connecting optical fibers in accordance with one of claims 1, 2, 5 and 6, wherein a chromatic dispersion and a dispersion slope of the first optical fiber having opposite signs to a chromatic dispersion and a dispersion slope of the second optical fiber at operating wavelength.

8. A method for connecting optical fibers in accordance with claim 7, wherein the operating wavelength is 1.55 $\mu$m.

* * * * *